Dec. 26, 1939.  J. L. WOODBRIDGE  2,185,098

NONSPILL VENT PLUG

Filed Jan. 3, 1938

WITNESS:
Rob R Kitchel.

INVENTOR
Joseph Lester Woodbridge
BY
Augustus B. Stoughton.
ATTORNEY.

Patented Dec. 26, 1939

2,185,098

UNITED STATES PATENT OFFICE 2,185,098

NONSPILL VENT PLUG

Joseph Lester Woodbridge, Philadelphia, Pa., assignor to The Electric Storage Battery Company, Philadelphia, Pa., a corporation of New Jersey Application January 3, 1938, Serial No. 183,016

6 Claims. (Cl. 251—147)

This vent plug is an improvement, the improvement comprising a modification in the shape of the valve member to provide greater turning moment for this member when the plug is tilted without increasing the diameter of the plug. In the present application, the valve member is bounded by a plane surface and two concentric, spherical surfaces, one of shorter radius on which the valve member rolls when the plug is tilted and the other of longer radius but with the same center, this latter spherical surface being arranged to close the orifice in the valve seat when the plug is tilted. With this modification in the design of the valve member, its center of gravity is moved further away from the center of the spherical surfaces so that the valve member will roll over to close the valve with less angular displacement of the plug from the vertical position, and when the plug has been tilted through a given angle, the moment of weight will be greater with the present design than with the designs heretofore known. The operation of the plug to close the valve when the plug is tilted will therefore be more positive in the present design.

The following description taken in connection with the accompanying drawing will fully explain the nature of the invention:

Figure 1:
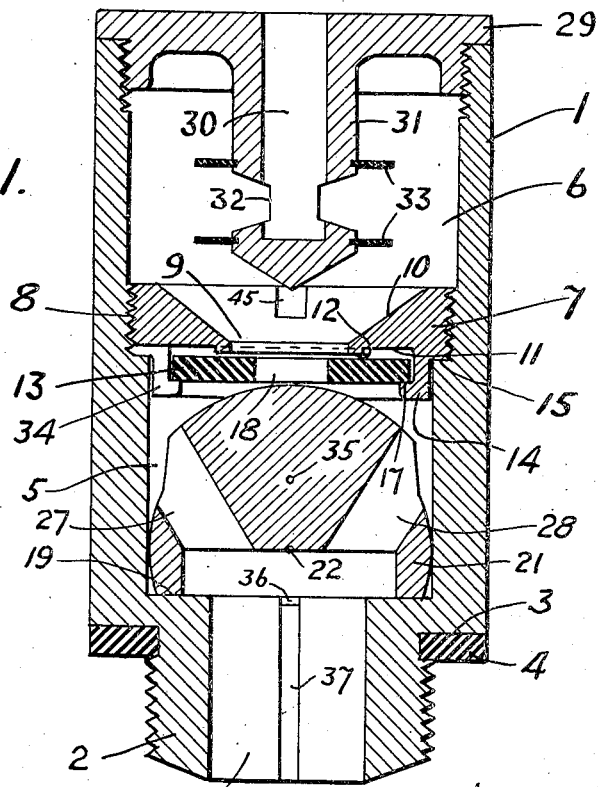
Fig. 1 is a view in vertical cross-section showing the vent plug in normal position.

In the drawing, 1 represents the vent plug generally which is preferably cylindrical in shape and is provided with a depending, cylindrical projection 2 externally threaded for engagement with the internal threads of an appropriate vent opening in the cover of a storage battery cell (not shown). A shoulder 3 is provided to which is applied a soft rubber gasket 4 to provide an air-tight seal between the vent plug and the cell cover.

The vent plug is hollow, having a lower cylindrical chamber 5 and an upper cylindrical chamber 6 separated by an annular partition member 7 whose external threads 8 engage corresponding threads on the internal wall of the vent plug. The partition member 7 is provided with an axial orifice 9 providing communication between the lower chamber 5 and the upper chamber 6 of the vent plug. The upper surface of the partition member 7 is conical as at 10, while the lower surface lies in a horizontal plane as at 11, and is provided with a lip or boss 12 surrounding the opening 9 and forming an abutment for the pliable valve seat 13. The partition member 7 is provided with a shoulder which seats on the shoulder 15 of the internal wall of the vent plug and is also provided with a depending skirt 14 having an inturned ledge 17 which supports the pliable valve seat 13 normally out of contact with the lip 12. The valve seat 13 has an axial orifice 18 confronting the orifice 9 in the partition member 7. Recesses 45 are provided at diametrically opposite points in the conical surface of the partition 7 to facilitate inserting and removing this member by means of a suitable tool such as a screw driver.

The lower chamber 5 is provided with an internal horizontal shoulder 19 surrounding the cylindrical passage 20 passing through the depending projection 2 and thus providing communication with the interior of the cell when the vent plug is in place in the cell cover.

The vent plug is surmounted by a cap 29 closing the top of the upper chamber 6 except for the vent duct 30 in the depending vent tube 31, having horizontal passages 32 leading from the vent duct 30 into the chamber 6. The vent duct 30 is closed at the bottom and spray baffles 33 are provided above and below the horizontal passages 32.

Within the lower chamber 5 is located the valve member 21. This valve member is bounded by a lower plane surface 24 and by two spherical surfaces 23 and 23$^a$. In the normal position of the valve member, the plane surface 24 rests on the shoulder 19 and the spherical surface 23 closely fits the internal cylindrical wall of the chamber 5, allowing just enough clearance to permit the valve member to roll along the cylindrical wall when the vent plug is tilted through a sufficient angle. It is not absolutely necessary that the upper surface of the shoulder 19 and the lower surface of the valve member 21 should be exactly plane. They might be slightly conical and still give satisfactory results. When the valve member rolls along the cylindrical wall of the chamber 5 as a result of the tilting of the plug, the spherical surface 23$^a$ comes into contact with the lower surface of the valve seat 13 and closes the orifice 18 as shown in Fig. 2.

Figure 2:
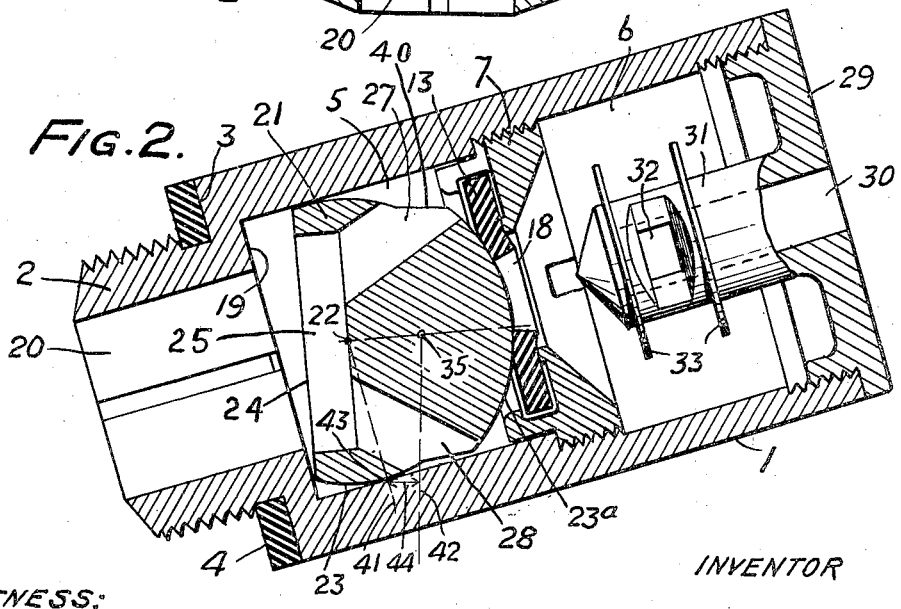
Fig. 2 is a view with parts broken away in longitudinal cross-section showing the vent plug in tilted position.

The spherical surfaces 23 and 23$^a$ have a common center indicated at 22, and between these two spherical surfaces there is provided a conical band 40 so designed that this part of the surface of the valve member cannot come in contact with the cylindrical wall of the chamber 5 when the plug is tilted as shown in Fig. 2. The center of gravity of the valve member is indicated at the point 35 which, by reason of the design of the valve member, is displaced by an appreciable distance from the center 22 of the spherical surfaces.

It will be noted that, as the plug is tilted from the vertical position to a position where the valve member begins to roll on the cylindrical wall of the chamber 5, the point of contact between the valve member and the cylindrical wall will always be in a line passing through the center 22 and extending at right angles to the cylindrical wall as illustrated by the line 41 in Fig. 2. The force of gravity tending to roll the valve member will be in a vertical line passing through the center of gravity as illustrated by the line 42 in Fig. 2. The gravitational moment tending to roll the valve member and cause it to close the orifice 18 in the valve seat 13 will therefore be the product of the weight of the valve member and the distance between the line 42 and the point of contact 43, this distance or lever arm being represented by the line 44 in Fig. 2. It is evident, therefore, that the greater the distance between the center of gravity 35 and the center 22 of the spherical surface on which the valve member rolls, the greater will be the lever arm 44 and the resultant gravitational moment which forces the valve member against the valve seat 13. The design of the valve member herein disclosed is adapted to provide the maximum distance between the point 35 and the point 22 with given dimensions of the plug. This feature is of importance where available space for the plug is limited and certain dimensions cannot be exceeded.

The valve member is provided with an axial cylindrical cavity 25 which is designed to remove as much weight as possible below the center point 22 and therefore displace the center of gravity 35 as far as possible from the center 22. Two cylindrical ducts 27 and 28 are provided extending from the cavity 25 to the external surface of the valve member between that portion of the spherical surface 23 on which the valve member rolls along the cylindrical wall of the chamber 5 and that portion of the spherical surface 23ª which closes the orifice 18 as shown in Fig. 2.

In the normal upright position of the vent plug, seen in Fig. 1, there is provided a passage for the escape of gas from the cell through the duct 20, the cavity 25, the ducts 27 and 28 in the valve member and the openings 18 and 9 in the valve seat and the partition member into the upper chamber 6 and from there through orifice 32 and vent duct 30 into the atmosphere. When the cell is tilted through a sufficient angle, the valve member 21 will roll into the position shown in Fig. 2, closing the orifice 18 and bringing the valve seat 13 against the annular lip 12 so as to close the passage between the chamber 6 and the chamber 5 and prevent the escape of liquid from the cell.

The depending skirt 14 is provided with a number of radial openings or slots 34. The object of these slots is to provide a path for draining back any liquid which may collect in the chamber 6, whether by failure of the valve member to close the opening 18 completely or by reason of the trapping of spray from the cell during the gassing period of charge. Since there is usually a certain amount of gas developed in a storage cell even when standing idle, it is necessary to provide for the drainage of this trapped liquid against the escape of gas bubbles through the opening 18. This is provided for by the space between the disk 13 and the underside of the partition 7, which space communicates with the slots 34, allowing the trapped liquid to pass down around the valve member 21 while the gas bubbles are escaping through the orifices 27 and 28 in the valve member and through the opening 18 in the disk 13. To further provide for this drainage of trapped liquid, one or more capillary grooves are provided in the upper surface of the shoulder 19 as indicated at 36. The groove 36 is continued as a vertical groove 37 in the cylindrical wall of the passage 20. It will thus be seen that there is provided a substantially continuous capillary path for the drainage of trapped liquid from the chamber 6 via the space 11, groove 34, the restricted space between the valve member 21 and the cylindrical wall surrounding it, the grooves 36 and 37, while gas is free to escape from the cell through the various ducts and passages already described.

The design and dimensions of the several parts of the device are such that, when the valve member 21 is in the position indicated in Fig. 2 corresponding to the limit of its travel in the direction toward the valve seat, the distance from the center 22 of its spherical surface to the inner edge of the shoulder 19 is less than the radius of the spherical surface, thus preventing the valve member 21 from rotating into a position from which it cannot roll back into its normal position supported on the shoulder 19 when the vent plug is restored to its upright position.

The ducts 27 and 28 through the valve member 21 are so located that, when the valve member has rolled into the position indicated in Fig. 2, neither of these ducts will overlap the opening 18 in the valve seat and allow liquid to escape in the tilted position of the vent plug.

The valve member 21 should preferably be made of relatively heavy material such as lead-antimony alloy.

The baffle plates 33 surrounding the vent tube 31 above and below the openings 32 prevent any liquid trapped in the chamber 6 from flowing across the openings 32 in the various positions of the plug in service where this liquid might be ejected through the duct 30 by any gas escaping from the cell.

I do not intend to be limited save as the scope of the prior art and of the attached claims may require.

I claim:

1. In a nonspill vent plug, a cylindrical wall defining a chamber, a pliable valve seat having an orifice and supported above the chamber, an internal supporting ledge at the bottom of the chamber, and a perforated valve member bounded by a substantially flat surface and two concentric spherical surfaces having radii of different lengths of which the lesser is only slightly less than that of the cylindrical wall, thereby preventing lateral displacement, said valve member normally resting with its flat surface on the supporting ledge and adapted when the vent plug is tilted to roll on its spherical surface of lesser radius along the cylindrical wall to bring its spherical surface of greater radius against the valve seat to close the orifice.

2. In a nonspill vent plug, a cylindrical wall defining a chamber, a pliable valve seat having an orifice and supported above the chamber, an internal supporting ledge at the bottom of the chamber, and a perforated valve member normally supported on the ledge and having an annular spherical surface of radius only slightly less than that of the cylindrical wall on which surface the valve member is adapted without appreciable lateral displacement to roll along the cylindrical wall toward the valve seat when the plug is tilted and said valve member having a second spherical surface concentric with but of greater radius than the first-named spherical surface, said second spherical surface so located as to contact with the valve seat to close the orifice when the valve member has rolled in response to tilting of the plug, the center of gravity of the valve member being axially displaced a substantial distance from the center of the spherical surfaces.

3. For storage batteries, a nonspill vent plug having a chamber provided with an inlet and an outlet, and a movable perforated valve member located in said chamber and having a surface which supports it in relatively stable position when said vent plug is vertical and having a second surface in the shape of the segment of a sphere at the rim of said first surface closely fitting and arranged for rolling contact with the wall of said chamber without appreciable lateral displacement when said plug is tilted and having another imperforate spherical surface concentric with the second surface and of greater radius arranged upon the rolling of said valve member to close the outlet from said chamber.

4. For storage batteries, a nonspill vent plug having a chamber provided with an inlet, a partition member having an orifice therein providing an exit from said chamber, and a perforated valve member normally located in relatively stable position in said chamber when said plug is vertical and having a surface in the shape of the segment of a sphere of sufficient radius to prevent appreciable lateral displacement arranged to roll on the inner surfaces of said plug when said plug is tilted and having another imperforate spherical surface concentric with the first-mentioned spherical surface and of greater radius arranged to close said exit when said plug is tilted.

5. For storage batteries, a nonspill vent plug having a chamber therein, a partition member having an orifice therein providing an exit from said chamber, and a valve member normally located in relatively stable position in said chamber when said plug is vertical and having an annular curved surface confronting the walls of said chamber and arranged to roll on the walls of said chamber when said plug is tilted and having a second surface in the shape of a portion of a sphere and arranged to contact with and close said exit when said plug is tilted, said valve member being provided with a branching conduit through it having communication at one end with the supporting surface of said valve member and having communication at its other ends with the surface of said valve member between said annular surface and said second surface.

6. For storage batteries, a nonspill vent plug having a chamber provided with an inlet, a partition member having an orifice providing an outlet from said chamber, a valve member normally located in relatively stable position in said chamber when said plug is vertical and having a surface in the shape of the segment of a sphere, of sufficient radius to prevent appreciable lateral displacement, arranged to roll on inner surfaces of said plug when the plug is tilted and having another spherical surface concentric with the first-mentioned spherical surface and of greater radius and arranged to close said outlet when said plug is tilted, and means permitting fluid flow from said inlet to said partition member.

JOSEPH LESTER WOODBRIDGE.